United States Patent [19]

Sanemitsu

[11] Patent Number: 5,784,704
[45] Date of Patent: Jul. 21, 1998

[54] MEMORY CARD WITH TIMER CONTROLLED PROTECTION OF STORED DATA

[75] Inventor: Yoshikado Sanemitsu, Itami, Japan

[73] Assignee: Mitsubishi Denki Kabushiki Kaisha, Tokyo, Japan

[21] Appl. No.: 747,724

[22] Filed: Nov. 12, 1996

Related U.S. Application Data

[63] Continuation of Ser. No. 364,443, Dec. 27, 1994, abandoned.

[30] Foreign Application Priority Data

Dec. 28, 1993 [JP] Japan ................... 5-336030

[51] Int. Cl.$^6$ ................... G06F 12/00; G06F 13/00
[52] U.S. Cl. ................... 711/164; 364/DIG. 1; 364/DIG. 2; 364/286.5; 364/286.6; 365/185.33; 365/218; 380/4; 711/100; 711/183; 711/187
[58] Field of Search ................... 395/427, 490, 395/491, 494; 380/4; 365/218, 185.33; 364/DIG. 1, DIG. 2, 286.5, 286.6; 711/100, 163, 164, 167

[56] References Cited

U.S. PATENT DOCUMENTS

| | | | |
|---|---|---|---|
| 3,890,601 | 6/1975 | Pietrolewicz | 395/491 |
| 4,858,197 | 8/1989 | Aono et al. | 365/233.5 |
| 5,166,503 | 11/1992 | Mizuta | 235/492 |
| 5,202,852 | 4/1993 | Mizuta | 365/189.01 |
| 5,319,765 | 6/1994 | Kimura | 395/491 |
| 5,343,030 | 8/1994 | Sanemitsu | 235/492 |
| 5,377,264 | 12/1994 | Lee et al. | 380/4 |
| 5,377,343 | 12/1994 | Yaezawa | 395/491 |
| 5,436,862 | 7/1995 | Sanemitsu | 365/189.01 |
| 5,452,355 | 9/1995 | Coli | 384/4 |
| 5,572,429 | 11/1996 | Hunter et al. | 364/464.02 |

*Primary Examiner*—Tod R. Swann
*Assistant Examiner*—Tuan V. Thai
*Attorney, Agent, or Firm*—Leydig, Voit & Mayer, Ltd.

[57] ABSTRACT

A memory card includes data protection circuitry preventing unauthorized reading of data from and writing of data into a memory. Authorized memory access begins when specific data is attempted to be written into a specific address. This step activates a timer for an active time period during which data can be read from or written to the memory card upon receipt of appropriate control signals. When the active period of the timer has elapsed, access to the memory card is denied until the specific data is again attempted to be written into the specific address.

6 Claims, 13 Drawing Sheets

103

203

MEMORY CARD WITH TIMER CONTROLLED PROTECTION OF STORED DATA

This disclosure is a continuation of patent application Ser. No. 08/364,443, filed Dec. 27, 1994, abandoned.

BACKGROUND OF THE INVENTION

1. Field of the Invention

The present invention relates to a memory card used as a memory medium connected to a system or the like, and, more particularly, to a security technique for protecting data stored in such a memory card.

2. Description of the Related Art

FIG. 22 is a block diagram generally illustrating the relationship between a memory card of this type and a system such as a terminal device. In FIG. 22, a system 300 comprises: a CPU 301 for performing data processing and also for controlling various elements; a ROM 302 acting as a nonvolatile memory for storing a program or the like; a RAM 303 acting as a volatile memory for temporarily storing data; an EEPROM 304 acting as a nonvolatile memory for storing data such as a processing result that has to be rewritten; and a timer 305 for indicating time such as operation start time, operation stop time, etc., to various elements wherein those elements are connected to each other via a bus 307. The CPU 301 performs data processing according to the program stored in the ROM 302. A memory card 100 or 200 (either a nonvolatile memory card 100 or a volatile memory card 200) is used as a memory medium that is removable from the system 300. The memory card 100 or 200 is removably connected to the terminal 300 via a connector 308 so that data is transmitted between the terminal 300 and the memory card 100 or 200 via an I/O (input/output) interface 306.

FIG. 23 is a block diagram illustrating a configuration of a conventional nonvolatile read-only memory card. In FIG. 23, the nonvolatile memory card is generally denoted by reference numeral 100, wherein the memory card 100 includes: a connector 1; a nonvolatile semiconductor memory 2 having a capacity of for example, 1 mega-byte; an address bus (A0–A19) 7; a card enable signal line 8; a read-out control signal line 10; a data bus (D0–D7) 12; a pull-up resistor 17; a power line 19; and ground line 20.

Now, the operation will be described below. Here, it is assumed that the circuit is constructed with the negative logic scheme. Signals will be denoted by the same symbols as those denoting the corresponding signal lines. The memory card 100 is connected to the system 300 as shown in FIG. 22, wherein, in operation, a power supply voltage is applied between the power line 19 and the ground line 20. When the card enable signal 8 is at an H-level, the card is in an inactive state. If the card enable signal 8 is turned to an L-level, then the card becomes active. In this active state, if the read-out control signal 10 is turned to an L-level, data at an address specified via the address bus 7 is read out via the data bus 12. When the card enable signal line 8 is in a high-impedance state "Hz", the pull-up resistor 17 allows the card enable signal line 8 to be fixed at an H-level so that the memory card is maintained inactive.

FIG. 24 is a block diagram illustrating a configuration of a conventional volatile memory card including a volatile memory capable of not only reading data but also writing data. In this figure, the volatile memory card is generally denoted by reference numeral 200. This volatile memory card differs from the nonvolatile memory card 100 shown in FIG. 23 in that the memory portion is made up of the volatile semiconductor memory 2a capable of not only reading data but also writing data. For the above reason, there is also provided a write control line 11. Furthermore, there is also provided a data backup circuit for retaining the data in the memory 2a even when the card 200 is not connected to the system 300. If a voltage detection circuit 50 detects that no electrical power is supplied from the system via the power line 19, then a power switching circuit 51 switches the power such that a battery 52 can provide backup electrical power for retaining the data in the memory 2a. In contrast, if the voltage detection circuit 50 detects electrical power supplied from the system via the power line 19, then the output 53 of the voltage detection circuit 50 cuts off the backup power from the battery 52.

As in the nonvolatile memory card 100, the memory card 100 is also connected to the system 300 so that a power supply voltage is applied between the power line 19 and the ground line 20. When the card enable signal 8 is at an H-level, the card is in an inactive state. If the card enable signal 8 is turned to an L-level, then the card becomes active. In this active state, if the read-out control signal 10 is turned to an L-level, and furthermore the write control signal 11 is turned to an H-level, then the data at an address specified via the address bus 7 is read out via the data bus 12. Contrarily, if the read-out control signal 10 is turned to an H-level, and the write control signal 11 is turned to an L-level, then the data supplied via the data bus 12 is written at an address specified via the address bus 7.

In the above, there are shown typical conventional memory cards. However, conventional memory cards including those described above have no security protection capability associated with the reading or writing of the data stored in the semiconductor memory. Therefore, the contents stored in the semiconductor memory can be easily read out to an external system or some data can be easily written into the semiconductor memory. This means that it is easy for another person to illegally copy (read out) or rewrite the data stored in the memory card.

SUMMARY OF THE INVENTION

It is an object of the present invention to solve the above problem. More specifically, it is an object of the present invention to provide a memory card having the capability of security protection such that the reading or writing of data (that is, access to a memory) is possible only by particular means.

According to a first aspect of the present invention, there is provided a memory card comprising: memory means for storing data; input/output means for inputting and outputting data, an address, and various external control signals used to control the memory means; data protection means including a timer that is activated and thus starts its counting operation when dummy writing of predetermined particular data is performed, and returns to an inactive state when a predetermined time has elapsed, wherein the protection means makes either the control signals or the address invalid during a period in which the timer is in the inactive state so that access to the memory means is inhibited during the period; and dummy writing means for performing the dummy writing into the timer.

According to a second aspect based on the above first aspect of the present invention, there is provided a memory card, wherein the data protection means comprises: a decoder for detecting whether the address and the control signal of the input/output means are in a state in which the dummy writing of data into the timer is performed; a first gate circuit that receives the output of the decoder and one bit of the dummy data, wherein when the output of the decoder and the one bit of the dummy data have predetermined values, respectively, the first gate circuit outputs a signal for starting the timer; and a second gate circuit disposed either in the path of the control signal of the input/output means or in the path of the address, wherein, in response to the output of the timer, the second gate circuit makes the signal of the input/output means invalid during a period in which the timer is in an inactive state; and the dummy writing means includes: a write control signal connected to the decoder; and an additional address bit used to perform the dummy writing into the timer.

According to a third aspect based on the above first aspect of the present invention, there is provided a memory card further including protection concealing means that activates the timer of the data protection means just after electrical power has been turned on thereby concealing the data protection capability so that the memory card looks as if it does not have the data protection capability.

According to a fourth aspect based on the above first aspect of the present invention, there is provided a memory card, wherein the data protection means comprises: a decoder for detecting whether the address and the control signal of the input/output means are in a state in which the dummy writing of data into the timer is performed; a data examination decoder for determining whether the data that has been dummy-written is identical to predetermined data; a third gate circuit that receives the output of the decoder and the output of the data examination decoder wherein when the output of the decoder and the output of the data examination decoder have predetermined values, respectively, the third gate circuit outputs a signal for starting the timer; and a fourth gate circuit disposed either in the path of the control signal of the input/output means or in the path of the address, wherein, in response to the output of the timer, the fourth gate circuit makes the signal of the input/output means invalid during a period in which the timer is in an inactive state.

According to a fifth aspect based on the above first aspect of the present invention, there is provided a memory card further including timer timeout value changing means for externally changing a timeout value of the timer of the data protection means.

According to a sixth aspect based on the above first aspect of the present invention, there is provided a memory card, wherein all the means are constructed on a single chip.

In the memory card according to the first aspect of the invention, there is provided data protection means that works as follows: When the timer is in an inactive state, the control signal for the memory means is inhibited from getting access to the memory means regardless of the state of the external signal. If dummy writing of the predetermined data into the timer is performed, the timer becomes active. As a result of the activation of the timer, the external control signal becomes valid and thus access to the memory during a preset time period is permitted. With this data protection means, any access to the memory is inhibited unless the dummy writing of the predetermined data into the timer is performed. If it is desired to have continuous access to the memory, it is required to repeatedly perform the above-described dummy writing during a normal operation at time intervals shorter than the timeout value of the timer.

In the memory card according to the second aspect of the present invention, the data protection means comprises: a decoder for detecting whether the control signal and the address are in a state in which the dummy writing of data into the timer is performed; a first gate circuit that receives the output of the decoder and one bit of the dummy data, wherein when the output of the decoder and the one bit of the dummy data have predetermined values, respectively, the first gate circuit outputs a signal for starting the timer; and a second gate circuit disposed at least either in the path of the control signal or in the path of the address, wherein in response to the output of the timer, the second gate circuit makes the control signal invalid during a period in which the timer is in an inactive state; wherein the data that is written in the dummy writing process consists of one-bit data having either an H-level or an L-level.

In the memory card according to the third aspect of the present invention, there is further provided protection concealing means that activates the timer of the data protection means just after electrical power has been turned on thereby concealing the data protection capability so that the memory card looks as if it does not have the data protection capability. This will confuse an unauthorized person, and therefore protect the data effectively.

In the memory card according to the fourth aspect of the present invention, the data protection means comprises: a decoder for detecting whether the control signal and the address are in a state in which the dummy writing of data into the timer is performed; a data examination decoder for determining whether the data that has been dummy-written is identical to predetermined data; a third gate circuit that receives the output of the decoder and the output of the data examination decoder wherein when the output of the decoder and the output of the data examination decoder have predetermined values, respectively, the third gate circuit outputs a signal for starting the timer; and a fourth gate circuit disposed either in the path of the control signal or in the path of the address, wherein, in response to the output of the timer, the fourth gate circuit makes the control signal and the address signal invalid during a period in which the timer is in an inactive state; wherein the data that is written in the dummy writing process consists of a plurality of bits. This provides more powerful data protection capability.

In the memory card according to the fifth aspect of the present invention, there is further provided timer timeout value changing means for externally changing a timeout value of the timer of the data protection means. This allows a user to select an active time period of the timer.

In the memory card according to the sixth aspect of the present invention, the entire circuit is constructed on a single chip. This makes discovering the data protection scheme from the outside more difficult.

DESCRIPTION OF THE PREFERRED EMBODIMENTS

Referring to accompanying drawings, nonvolatile read-only memory cards as well as volatile read/write memory cards embodying the present invention will be described below.

Embodiment 1

Figure 1:
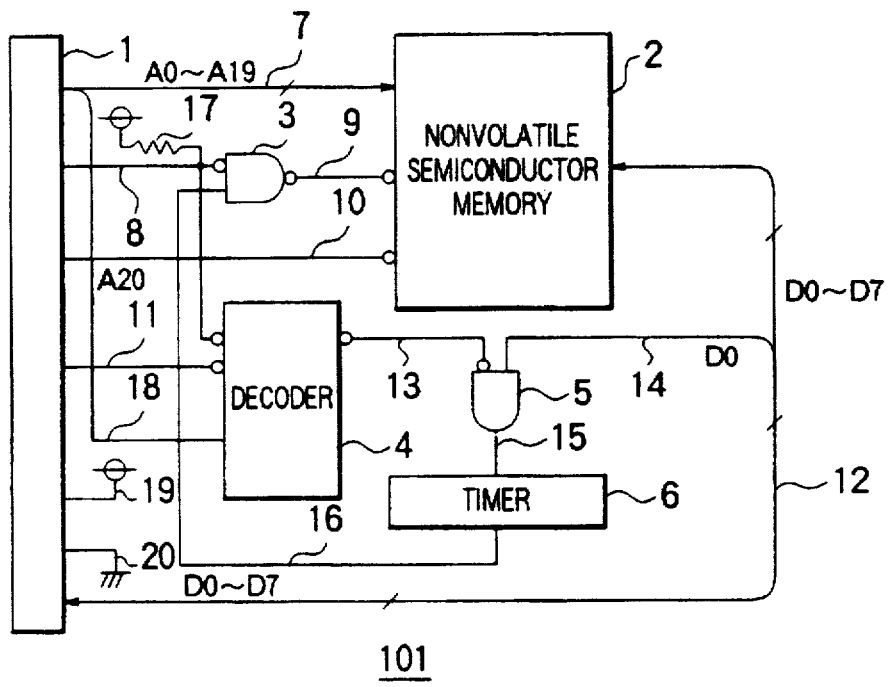
FIG. 1 is a block diagram illustrating the configuration of a nonvolatile memory card according to a first embodiment of the present invention.

FIG. 1 is a block diagram illustrating the configuration of a nonvolatile memory card according to a first embodiment of the present invention. In FIG. 1, the nonvolatile memory card is generally denoted by reference numeral 101, wherein the memory card 101 includes: a connector 1; a nonvolatile semiconductor memory 2 having a capacity of 1 Mbyte; a NAND gate 3; a decoder 4; an AND gate 5; a timer 6; a pull-up resistor 17; a power line 19; and ground line 20. There is also provided an address bus (A0–A20) 7 whose lower address lines (A0–A19) are connected to the nonvolatile semiconductor memory 2, and whose upper address line (A20) 18 is connected to the decoder 4. The memory card 101 also includes a card enable signal line 8 connected to the NAND gate 3 as well as to the control input of the decoder 4. Furthermore, the memory card 101 includes a read-out control line 10 connected to the nonvolatile semiconductor memory 2. A write control line 11 is also connected to the control input of the decoder 4. The write control line 11 is used to control dummy writing of particular data for starting the timer 6 as will be described later. A data bus (D0–D7) 12 is also connected to the nonvolatile semiconductor memory 2, wherein one line (D0) of the data bus 12, serving as a signal line 14, is connected to the AND gate 5. The output 13 of the decoder 4 is connected to the other input of the AND gate 5. The output of the AND gate 5 is connected to the control input of the timer 6 via a signal line 15. The output line 16 of the timer 6 is connected to an input of the NAND gate 3 so that the chip enable signal 9 used to make the nonvolatile semiconductor memory 2 active is determined by a combination of signals 16 and 8.

Figure 2:
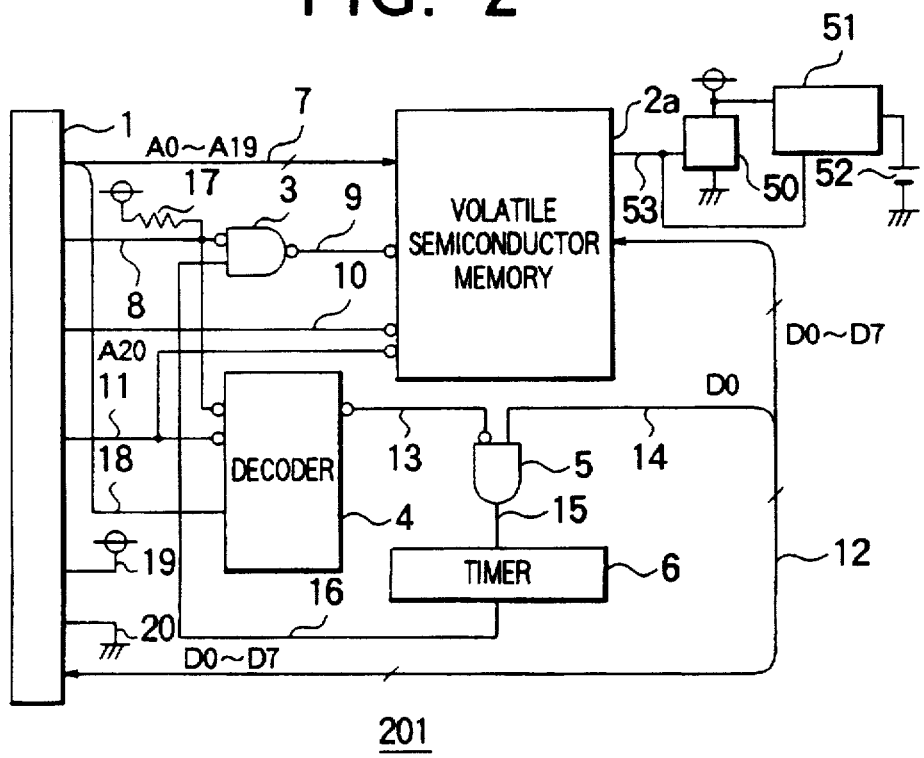
FIG. 2 is a block diagram illustrating the configuration of a volatile memory card according to the first embodiment of the present invention.

FIG. 2 is a block diagram illustrating the configuration of a volatile memory card according to a first embodiment of the present invention. The volatile memory card 201 shown in FIG. 2 differs from the nonvolatile memory card 101 shown in FIG. 1 in that the memory portion is made up of a volatile semiconductor memory 2a capable of not only reading data but also writing data, and also in that the writing control signal line 11 usually connected to the memory 2a is also connected to the decoder 4 via which a dummy writing operation for starting the timer 6 is performed. Another difference is that there is provided a data backup circuit including a voltage detection circuit 50, a power switching circuit 51, and a battery 52.

The decoder 4 shown in FIGS. 1 and 2 outputs an L-level output signal 13 when the card enable signal 8 and the write control signal 11 are both at an L-level and the upper address (A20) 18 is at an H-level. The decoder 4 may be composed of for example, a three-input NAND gate (not shown) to which the card enable signal 8 and the write control signal 11 are input via an inverter (not shown) and the upper address (A20) 18 is directly input.

Figure 3:
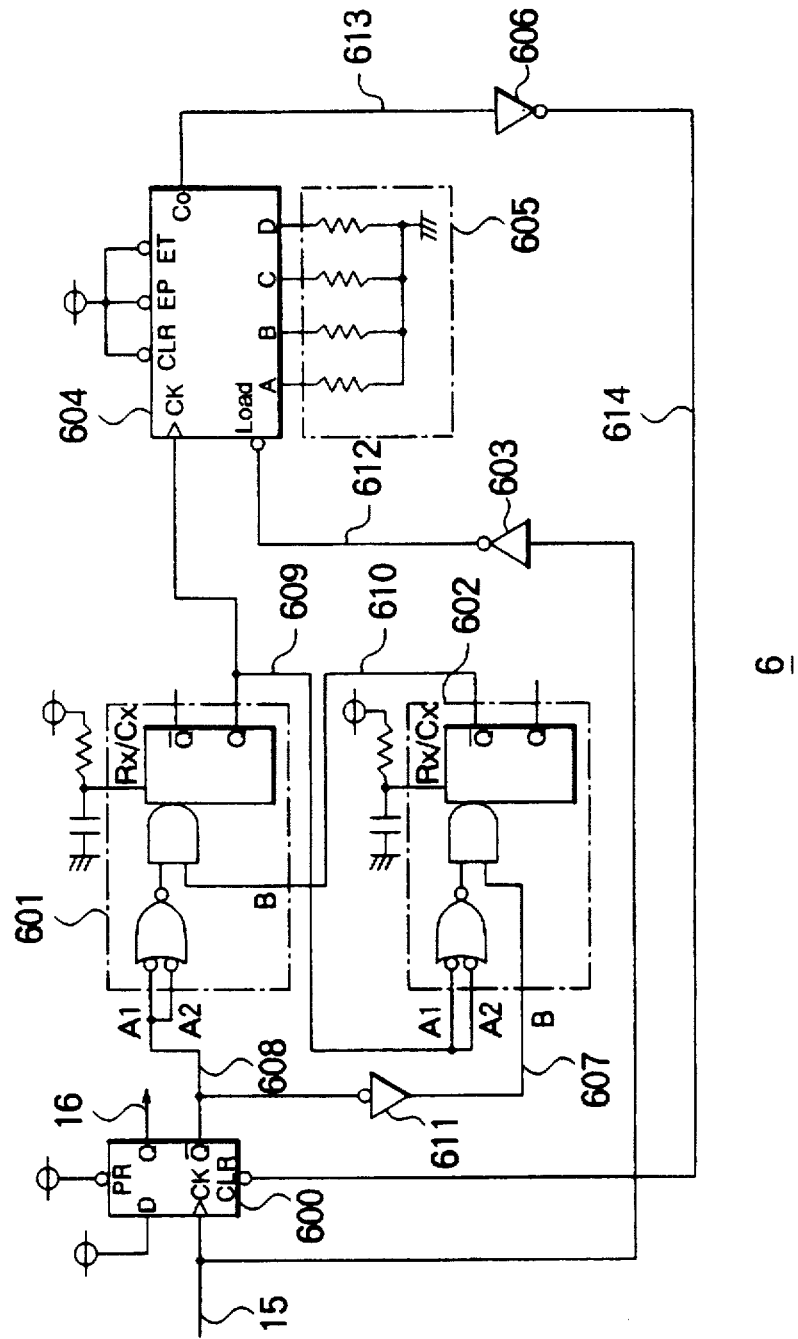
FIG. 3 illustrates a circuit implementing a timer shown in FIGS. 1 and 2.

As for the timer 6, any type of timer may be employed that can turn its output signal 16 to an H-level and start its counting operation when the input signal 15 is turned to an H-level, and return its output signal 16 to an L-level when a predetermined time has elapsed. FIG. 3 illustrates an example of a circuit implementing the timer 6. The circuit shown in FIG. 3 comprises: a D-type flip-flop 600 such as the LS74; monostable mutivibrators 601 and 602 such as the LS121; inverters 603, 606, and 611; a binary counter with preset capability 604 such as the LS161; and a time setting portion 605 composed of resistors for setting a timeout value of the timer.

The timer 6 shown in FIG. 3 operates in a manner described below. When the input signal 15 is turned from an L-level to an H-level, the output 608 goes to an L-level and the output 607 of the inverter 611 goes to an H-level. Thus, (1) since the signal 610 is at an H-level, the multivibrator 601 starts its operation at the falling edge of the output 608, and provides a positive pulse as the output 609. (2) Then, the multivibrator 602 starts its operation at the falling edge of the output 609 and provides a negative pulse as the output 610. The operation steps (1) and (2) described above are performed repeatedly so as to provide a clock signal to the 4-bit binary counter 604.

When the input signal 15 is at an H-level, the binary counter 604 is set to an initial value (0000b) by the time setting portion 605 composed of resistors. Then, the count of the binary counter 604 is incremented each time the above-described clock signal is input. When the count of the counter 604 reaches (1111b), the output 613 goes to an H-level which is inverted by the inverter 606 and thus an L-level signal 614 is output. The output 16 of the D-type flip-flop 600, that has become high at the rising edge of the input signal 15, goes to an L-level in response to the L-level input signal 614.

Figure 22:
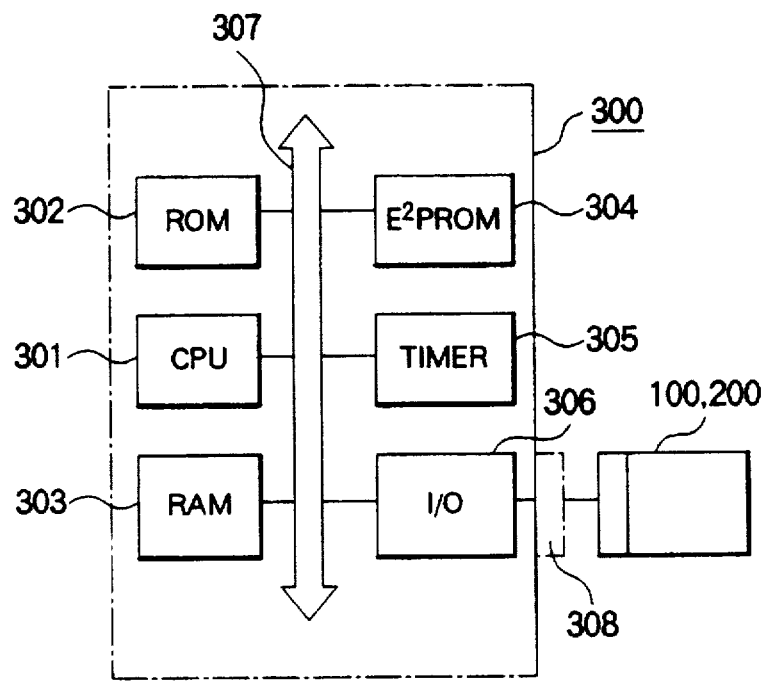
FIG. 22 is a block diagram illustrating the relationship between a memory card and a system.
Figure 23:
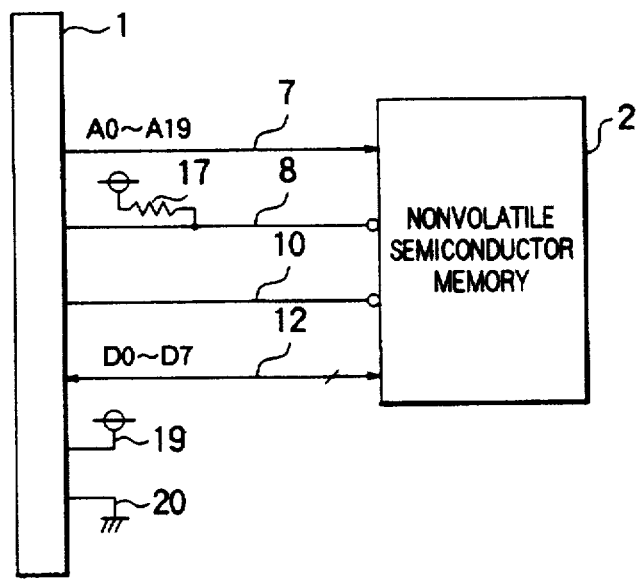
FIG. 23 is a block diagram illustrating a configuration of a conventional nonvolatile memory card.
Figure 24:
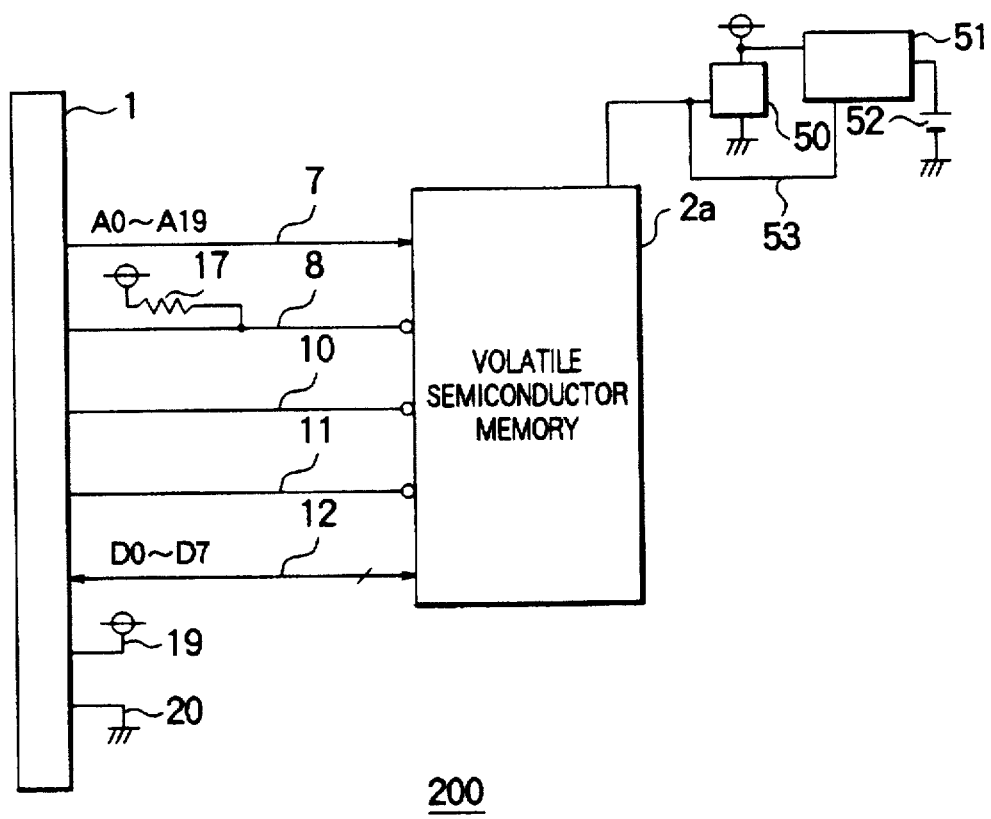
FIG. 24 is a block diagram illustrating a configuration of a conventional volatile memory card.

Now, the operation of the nonvolatile read-only memory card shown in FIG. 1 will be described below. Here, it is assumed that the circuit is constructed with the negative logic scheme. Signals will be denoted by the same symbols as those denoting the corresponding signal lines. When the memory card 101 is connected to the system 300 via the connector 1 as shown in FIG. 22 and thus a power supply voltage is applied, the timer 6 is in an inactive state, and therefore its output 16 is at an L-level. As a result, the output of the NAND gate 3 acting as the chip enable signal 9 is at an H-level regardless of the input level of the card enable signal 8. Thus, the nonvolatile semiconductor memory 2 is also in an inactive state, and therefore no data can be read out from the memory card 101.

To read out the data from the memory card 101, it is required to write the particular dummy data into the timer 6 thereby starting the timer 6. The writing of the dummy data is performed in such a manner that an address (1FFFFFh) whose upper address (A20) 18 has an H-level is input via the address bus 7, the read-out control signal 10 is turned to an H-level, the write control signal 11 is turned to an L-level, and the predetermined particular dummy data is written into the timer 6 via the data bus 12. If all signals, including the upper address (A20) 18, the card enable signal 8, and the write control signal 11, are at the above-described states and therefore if the operation is in the dummy writing state, then the decoder 4 goes to a selected state and thus its output 13 goes to an L-level. In this state, if data whose least significant bit is at an H-level such as (01h) is written as dummy data via the data bus 12, then the signal (D0) 14 goes to an H-level, and the output 15 of the AND gate 5 goes to an H-level, thereby starting the timer 6. During a time period in which the timer 6 is active, the output 16 is maintained at the H-level. In this state, therefore, if the card enable signal 8 is turned to an L-level, and the read-out control signal 10 is also turned to an L-level, then data stored in the memory 2 at a location specified by the address (A0–A19) 7 is output via the data bus 12. When the timer 6 has completed the counting corresponding to the predetermined timeout value, the output 16 of the timer 6 returns to the L-level. As a result, reading the data from the memory 2 becomes prohibited again.

As described above, to read some data from the memory card 101, it is required to write predetermined particular dummy data into the timer 6. Therefore, if it is desired to read data continuously, it is required to periodically write the predetermined dummy data into the timer 6 at time intervals shorter than the timeout length set in the timer 6. Therefore, if someone who does not know this fact tries to read data from the memory card 101, he or she cannot do so. Thus, the data or program stored in the memory card 101 is protected from being copied illegally.

Now, the operation of the volatile memory card 201, shown in FIG. 2, capable of not only reading data but also writing i.e. recording, data will be described below. This volatile memory card 201 operates in basically the same manner as the nonvolatile memory card 101, and therefore writing dummy data to the timer 6 is required to start the timer 6 before writing data into or reading data from the volatile memory card 201. When the timer 6 is active and thus its output 16 is maintained at an H-level, if the card enable signal 8 is turned to an L-level, and the read-out control signal 10 is also turned to an L-level, then data stored in the memory 2a at a location specified by the address (A0–A19) 7 is output via the data bus 12. If the read-out control signal 10 is turned to an H-level and the write control signal 11 is turned to an L-level, then it becomes possible to write data into the memory 2a at a location specified by the address (A0–A19) 7 via the data bus 12.

To read data from or write data into the memory card 201, it is required to write the particular dummy data into the timer 6. Therefore, if it is desired to read or write data continuously, it is required to periodically write the predetermined dummy data into the timer 6 at time intervals shorter than the timeout length set in the timer 6. Therefore, if someone who does not know the above fact tries to read data from or write data into the memory card 101, he or she cannot do so. Thus, the data or program stored in the memory card 101 is protected from being copied or changed illegally.

In the memory cards 101 and 102 shown in FIGS. 1 and 2, the memory means includes the nonvolatile semiconductor memory 2 or the volatile semiconductor memory 2a provided with a backup circuit including elements 50–53.

The input/output means comprises: the lower address bus (A0–A19); the card enable signal line 8; the chip enable signal line 9; the read-out control signal line 10; the write control signal line 11 (only in the case of the volatile memory card); and the data bus 12.

The data protection means comprises the decoder 4, the timer 6, the AND gate 5, and the NAND gate 3.

The dummy data writing means comprises the write control signal line 11 and the upper address (A20) 18.

Embodiment 2

Figure 4:
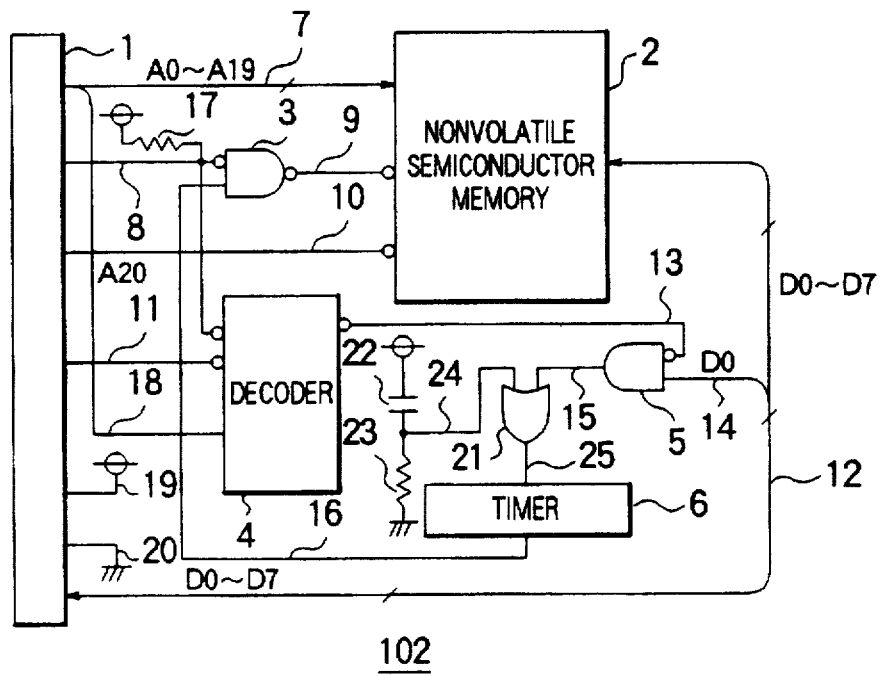
FIG. 4 is a block diagram illustrating the configuration of a nonvolatile memory card according to a second embodiment of the present invention.
Figure 5:
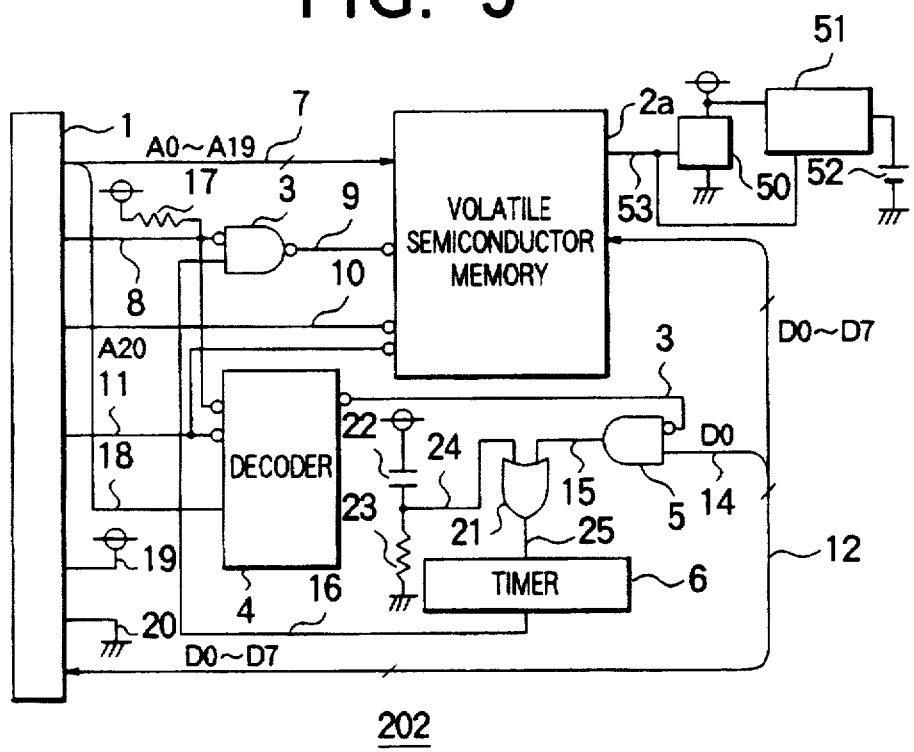
FIG. 5 is a block diagram illustrating the configuration of a volatile memory card according to the second embodiment of the present invention.

FIG. 4 is a block diagram illustrating the configuration of a nonvolatile memory card according to a second embodiment of the present invention, and FIG. 5 is a block diagram illustrating the configuration of a volatile memory card also according to the second embodiment of the present invention. In these memory cards 102 and 202 shown in FIGS. 4 and 5, there is provided protection concealing means comprising an OR gate 21, a capacitor 22, and a resistor 23, whereby the level of a signal 24 is turned to an H-level for a while just after the power is turned on, and the H-level signal 24 is transmitted via the OR gate 21 as the signal 25 to the timer 6 so that the timer 6 becomes active (for a time period in which all data cannot be read from the memory 2 or 2a) regardless of the level of the signal 15, and thus it becomes possible to read or write data from or into the memory 2 or 2a for a while. For a while immediately after the memory card 102 or 202 has been connected to the system and the electrical power has been turned on, it looks, from the outside, possible to read or write data, that is the data protection capability of the memory card is concealed. According to the above arrangement, it is possible to get access to data only for the first active period of the timer 6, however once the timer 5 has become inactive after the above time period has lapsed, it is no longer possible to get access to the data unless the dummy data is written to the timer 6. As a result, if some one tries to make an illegal copy of the data or program stored in the memory card, he or she cannot notice that the memory card has the data protection capability. This is very effective to prevent illegal copying of the data or program.

Embodiment 3

Figure 6:
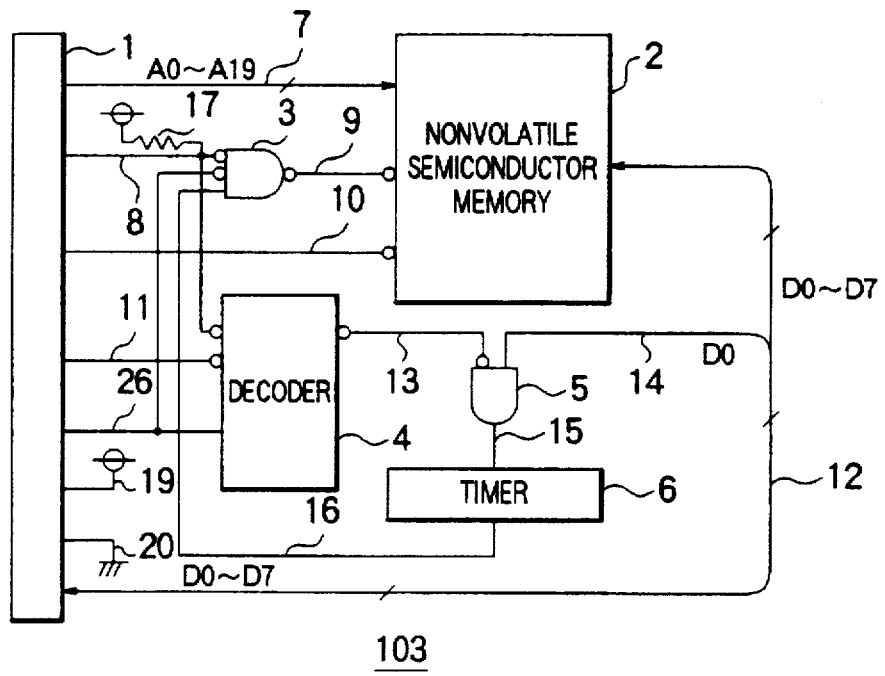
FIG. 6 is a block diagram illustrating the configuration of a nonvolatile memory card according to a third embodiment of the present invention.
Figure 7:
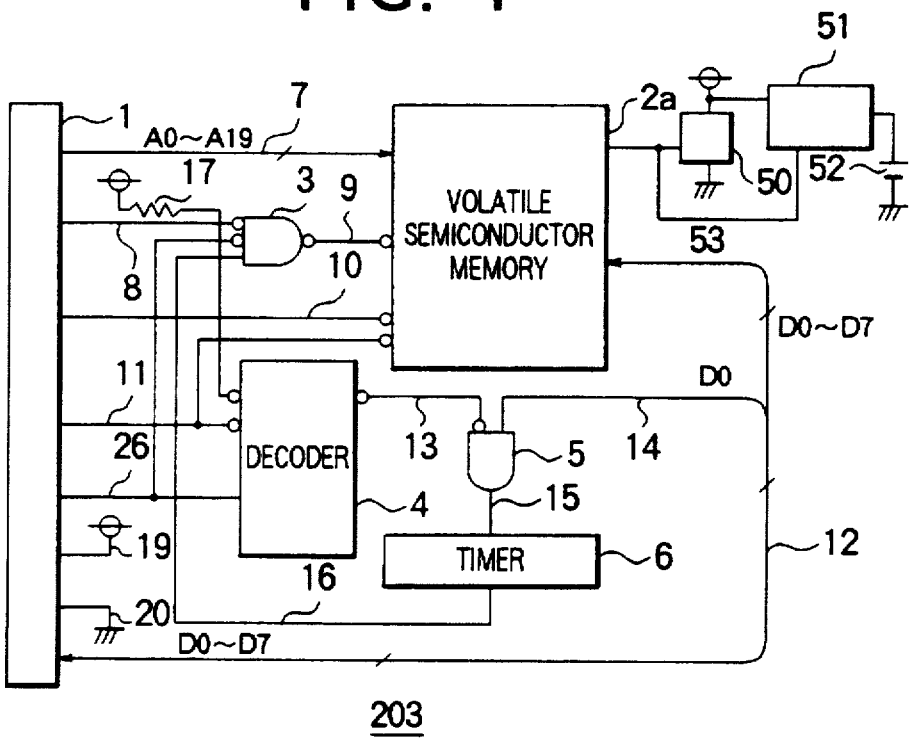
FIG. 7 is a block diagram illustrating the configuration of a volatile memory card according to the third embodiment of the present invention.

FIG. 6 is a block diagram illustrating the configuration of a nonvolatile memory card according to a third embodiment of the present invention, and FIG. 7 is a block diagram illustrating the configuration of a volatile memory card also according to the third embodiment of the present invention. In the previous embodiments described above, the upper address (A20) is added to the lower address (A0–A19) so as to make possible writing of dummy data into the timer 6. This means that when the system controls the memory card, both timer 6 and memory 2 or 2a are controlled via the same control space. In contrast, in the case of the memory card 103 shown in FIG. 6 and also the memory card 203 shown in FIG. 7, the timer 6 and the memory 2 or 2a are disposed in different spaces such that either the timer 6 or the memory 2 or 2a is selected by the memory selection signal 26. That is, the memory selection signal is turned to an H-level when the dummy data is written into the timer 6, and the memory selection signal is turned to an L-level when the memory 2 or 2a is selected. This allows the system to control the memory card more easily.

Embodiment 4

Figure 8:
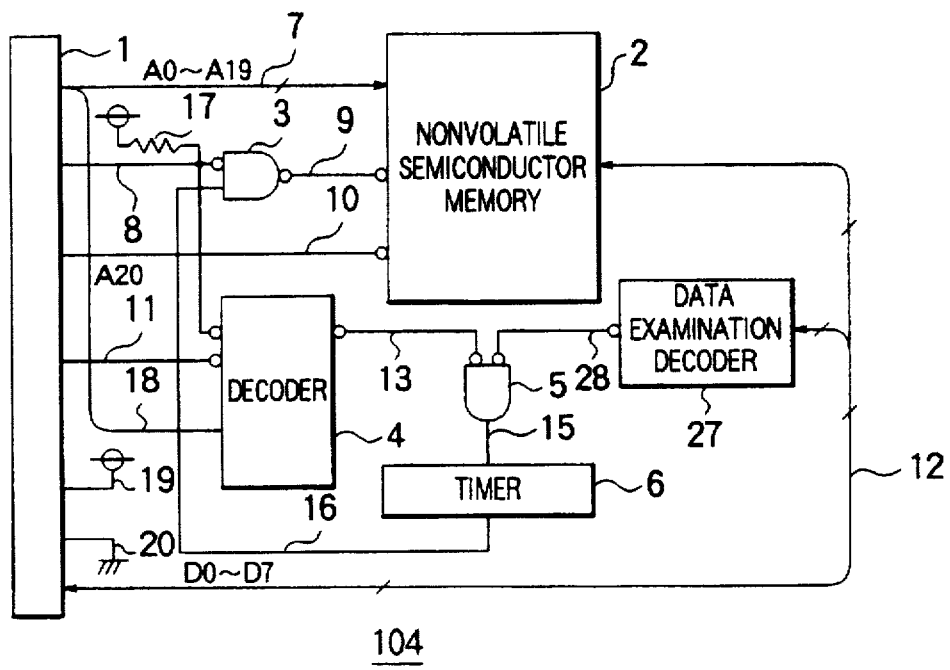
FIG. 8 is a block diagram illustrating the configuration of a nonvolatile memory card according to a fourth embodiment of the present invention.
Figure 9:
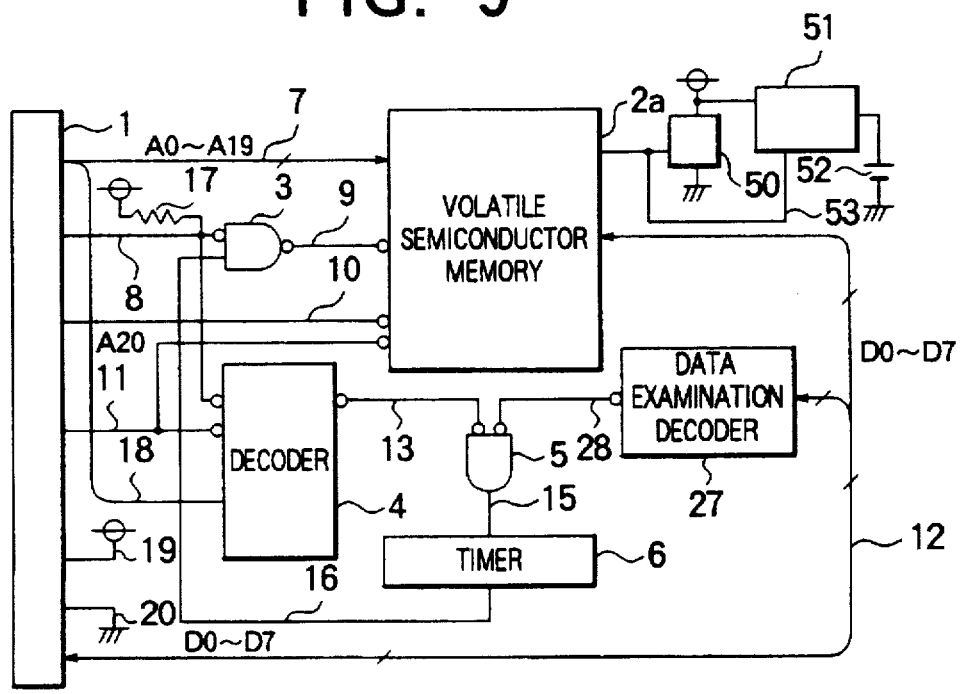
FIG. 9 is a block diagram illustrating the configuration of a volatile memory card according to the fourth embodiment of the present invention.

FIG. 8 is a block diagram illustrating the configuration of a nonvolatile memory card according to a fourth embodiment of the present invention, and FIG. 9 is a block diagram illustrating the configuration of a volatile memory card also according to the fourth embodiment of the present invention. In the previous embodiments described above, when the dummy data is written to the timer 6, only its least significant bit is used to activate the timer 6. Unlike these embodiments, all bits of for example, 8-bit data are used in this fourth embodiment. In the memory card 104 shown in FIG. 8 and also in the memory card 204 shown in FIG. 9, there is provided a data examination decoder 27 whereby the timer 6 is activated only when 8-bit dummy data written into the timer 6 is identical to the predetermined data that has been set in the data examination decoder 27.

Figure 10:
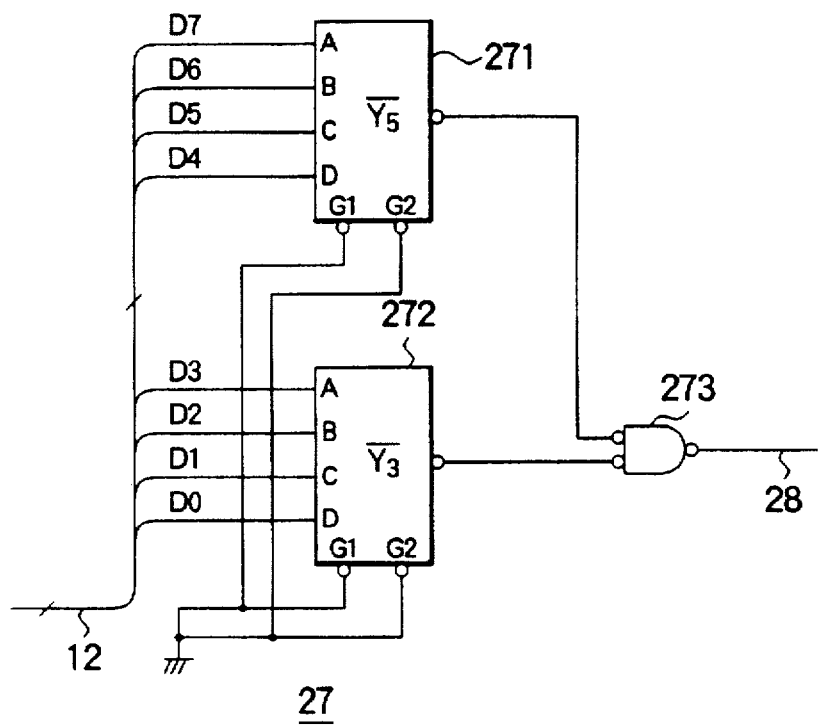
FIG. 10 illustrates a circuit implementing a data examination decoder shown in FIGS. 8 and 9.

FIG. 10 illustrates an example of a circuit implementing the data examination decoder 27. As shown in FIG. 10, the data examination decoder 27 includes 4-to-16 decoders 271 and 272 such as the LS154, and a NAND gate 273. In each 4-to-16 decoder 271 and 272, when an L-level signal is applied to both G1 and G2, one of 16 outputs Y0 through Y15 (only one of them is shown in FIG. 10) is turned to an L-level depending on a 4-bit input signal consisting of A through D. The decoder 271 employs Y5 as its output, and thus provides an L-level output signal when the input consisting of A through D is identical to (010b). The decoder 272 employs Y3 as its output, and thus provides an L-level output signal when the input consisting of A through D is identical to (0011b). Thus, the output 28 of the data examination decoder 27 goes to an L-level when data identical to (01010011b) is input via the data bus 12. At this time, if the output signal 13 of the decoder 4 is also at an L-level, then the timer 6 becomes activated.

In the present embodiment, as described above, the data examination decoder 27 examines 8-bit data to be written as the dummy data into the timer 6, and the timer 6 is activated according to the examination result of the data examination decoder 27, thereby providing more powerful data protection capability.

Embodiment 5

Figure 11:
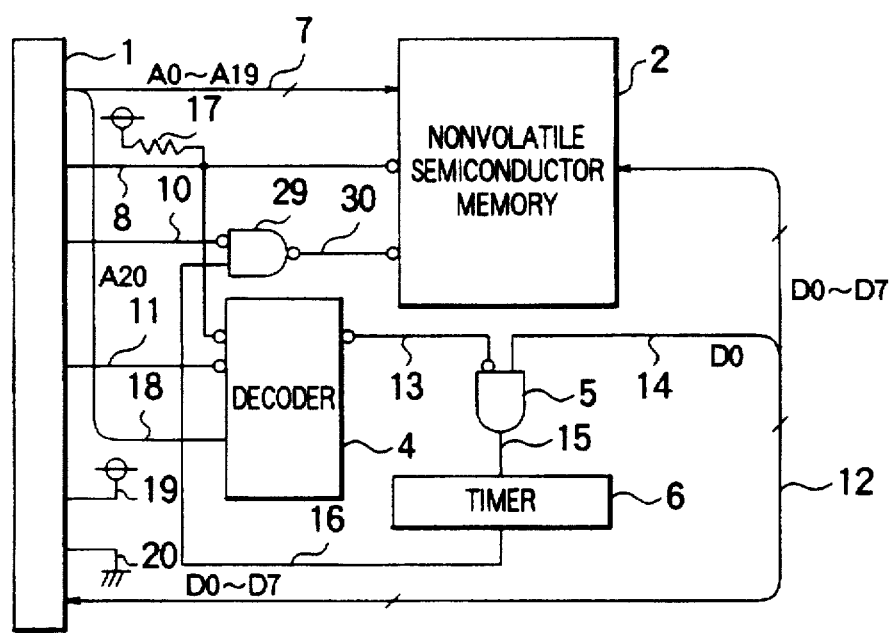
FIG. 11 is a block diagram illustrating the configuration of a nonvolatile memory card according to a fifth embodiment of the present invention.
Figure 12:
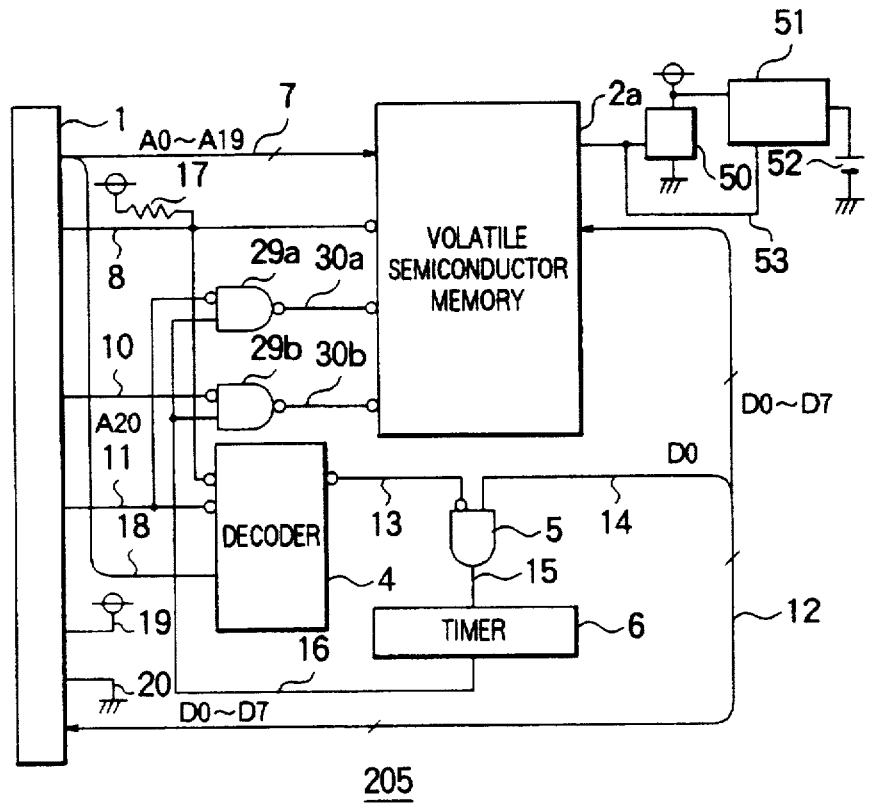
FIG. 12 is a block diagram illustrating the configuration of a volatile memory card according to the fifth embodiment of the present invention.

FIG. 11 is a block diagram illustrating the configuration of a nonvolatile memory card according to a fifth embodiment of the present invention, and FIG. 12 is a block diagram illustrating the configuration of a volatile memory card also according to the fifth embodiment of the present invention. In the previous embodiments described above, the card enable signal line 8 is connected to the NAND gate 3 so that when the timer 6 is in an inactive state the card enable signal 8 is made invalid and thus data of the semiconductor memory is inhibited from being read or written.

In contrast, in the nonvolatile memory card 105 shown in FIG. 11, the read-out control signal line 10 is connected to the NAND gate 29 that is controlled by the output signal 16 of the timer 6 such that when the signal 16 is at an L-level the read-out signal 30 is turned to an H-level thereby inhibiting the reading of data. In the volatile memory card 205 shown in FIG. 12, the write control signal line 11 and the read-out control signal line 10 are connected to the NAND gates 29a and 29b, respectively, that are both controlled by the output signal 16 of the timer 6 such that when the signal 16 is at an L-level, the write control signal 30a and the read-out signal 30b are both turned to an H-level thereby inhibiting the reading and writing of data. These arrangements according to the fifth embodiment also provide powerful data protection capability.

Embodiment 6

Figure 13:
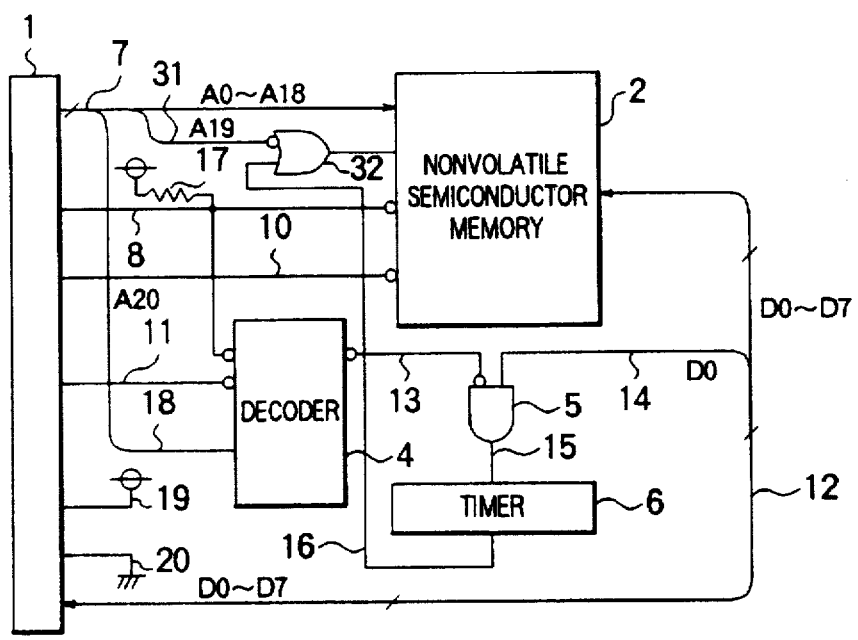
FIG. 13 is a block diagram illustrating the configuration of a nonvolatile memory card according to a sixth embodiment of the present invention.
Figure 14:
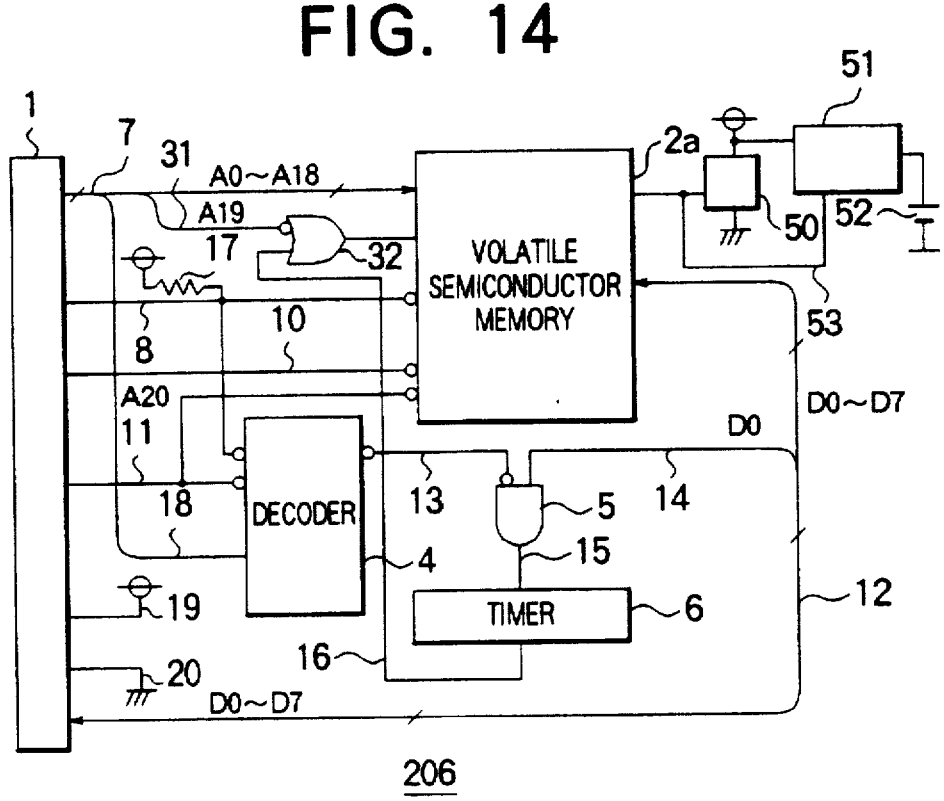
FIG. 14 is a block diagram illustrating the configuration of a volatile memory card according to the sixth embodiment of the present invention.

FIG. 13 is a block diagram illustrating the configuration of a nonvolatile memory card according to a sixth embodiment of the present invention, and FIG. 14 is a block diagram illustrating the configuration of a volatile memory card also according to the sixth embodiment of the present invention. In the sixth embodiment, when the timer 6 is in an inactive state, the most significant bit (A19) of the lower address (A0–A19) is fixed to an L-level thereby inhibiting reading or both reading and writing of half of the memory map of the memory 2 or 2a and thus protecting the data.

In the nonvolatile memory card 106 shown in FIG. 13 and also in the volatile memory card 206 shown in FIG. 14, the address line (A19) 31 is connected to the OR gate 32 that is controlled by the output signal 16 of the timer 6 such that when the signal 16 is at an L-level the address line (A19) is fixed at an L-level thereby inhibiting reading or both reading and writing of half of the memory area of the memory 2 or 2a. Alternatively, any one of address lines of the lower address (A0–A19) instead of the address line (A19) may also be connected to the OR gate 32 thereby achieving a similar effect in data protection whereby reading or writing of data is inhibited for different scattered memory areas.

According to the present embodiment, as described above, the reading or writing of data for the memory 2 or 2a is partially inhibited so that only part of data or program stored in the memory can be copied thereby protecting the data or program from being illegally used.

Embodiment 7

Figure 15:
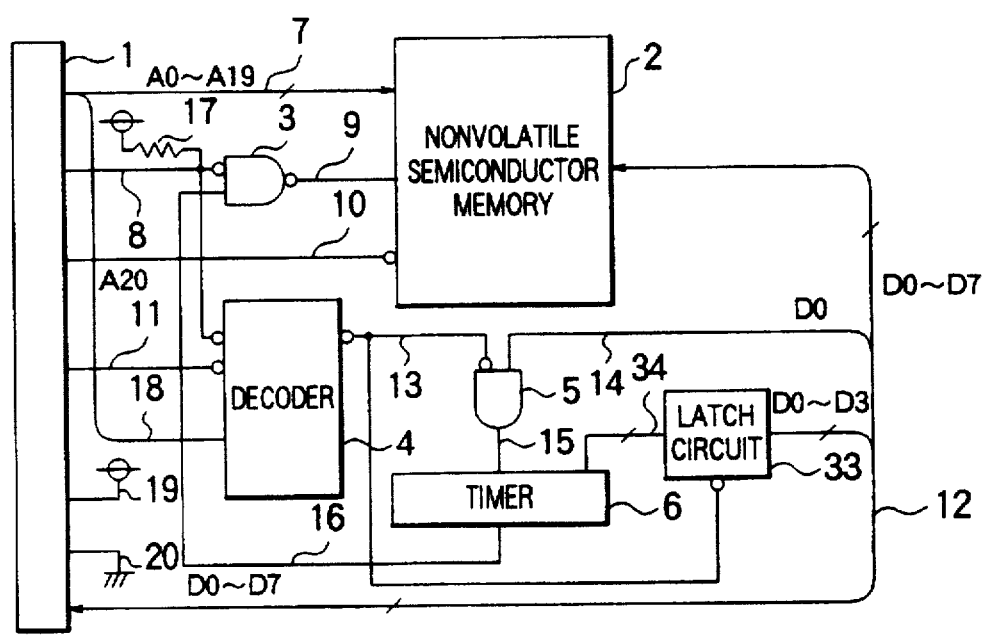
FIG. 15 is a block diagram illustrating the configuration of a nonvolatile memory card according to a seventh embodiment of the present invention.
Figure 16:
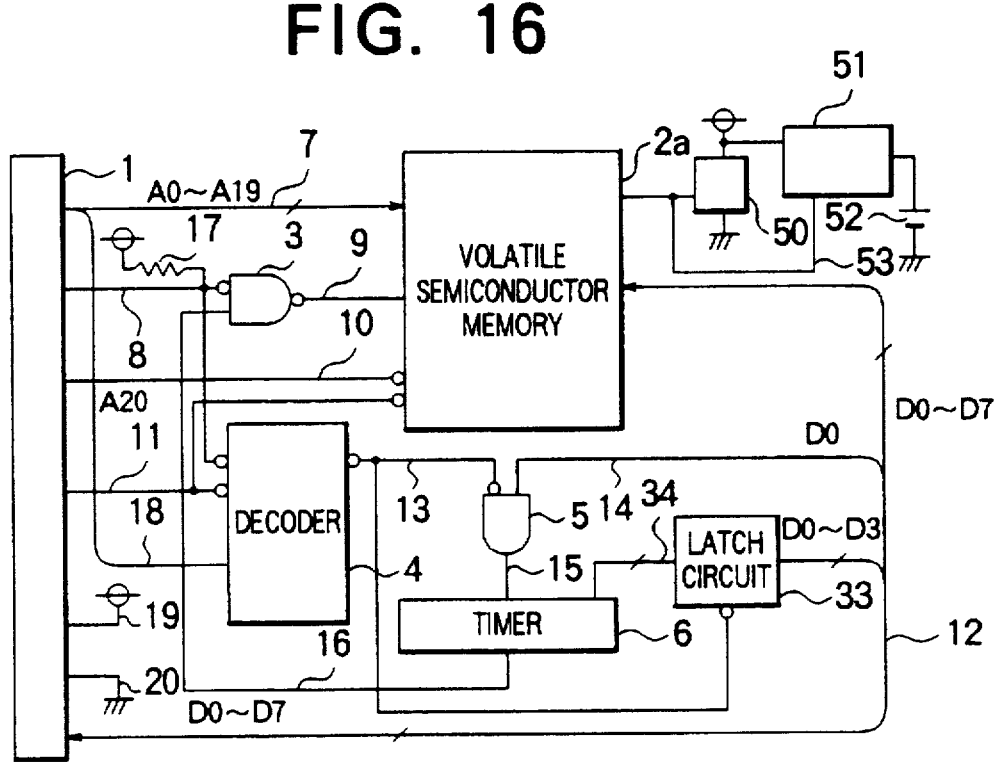
FIG. 16 is a block diagram illustrating the configuration of a volatile memory card according to the seventh embodiment of the present invention.

FIG. 15 is a block diagram illustrating the configuration of a nonvolatile memory card according to a seventh embodiment of the present invention, and FIG. 16 is a block diagram illustrating the configuration of a volatile memory card also according to the seventh embodiment of the present invention. In this seventh embodiment, the timer 6 timeout value may be externally changed. In the nonvolatile memory card 107 shown in FIG. 15 and also in the volatile memory card 207 shown in FIG. 16, there is provided a latch 33 acting as means for changing the timeout value of the timer 6 whereby an arbitrary timeout value (including an infinite period) can be set to the timer 6 via the latch 33 before the timer 6 is activated. The timer 6 itself is basically the same as that shown in FIG. 3. However, in the present embodiment, the time setting portion 605, composed of resistors shown in FIG. 3, is no longer necessary, and thus the output 34 of the latch 33 is directly connected to the timer 6.

Figure 17:
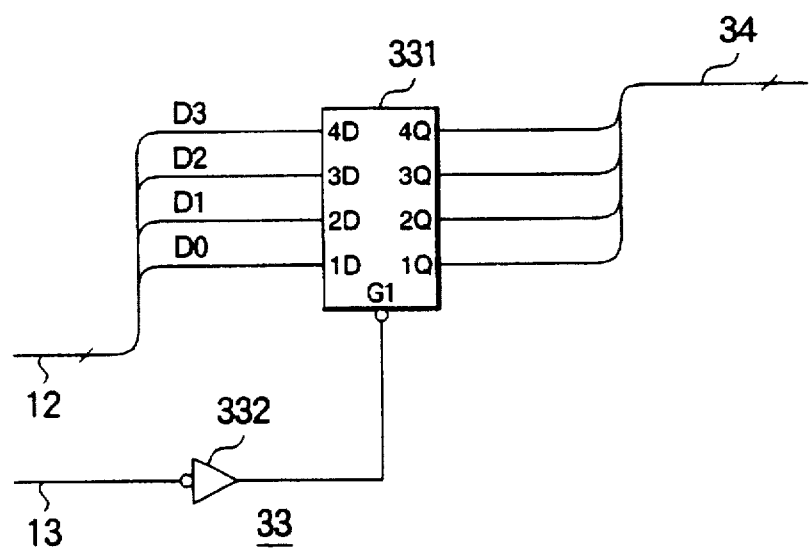
FIG. 17 illustrates a circuit implementing a latch shown in FIGS. 15 and 16.

FIG. 17 illustrates an example of a circuit implementing the latch 33. In FIG. 17, reference numeral 331 denotes a 4-bit latch such as the LS77, and reference numeral 332 is an inverter. When the output 13 of the decoder 4 is turned to an L-level, the lower 4 bits of data input via the data bus 12 are latched, and the timeout value of the timer 6 is set according to the latched data.

According to the present embodiment, the timeout value of the timer 6 is set externally as required in situations or conditions of practical use. This allows the data protection capability and, therefore the memory card to be applied to a wider range of applications.

Embodiment 8

Figure 18:
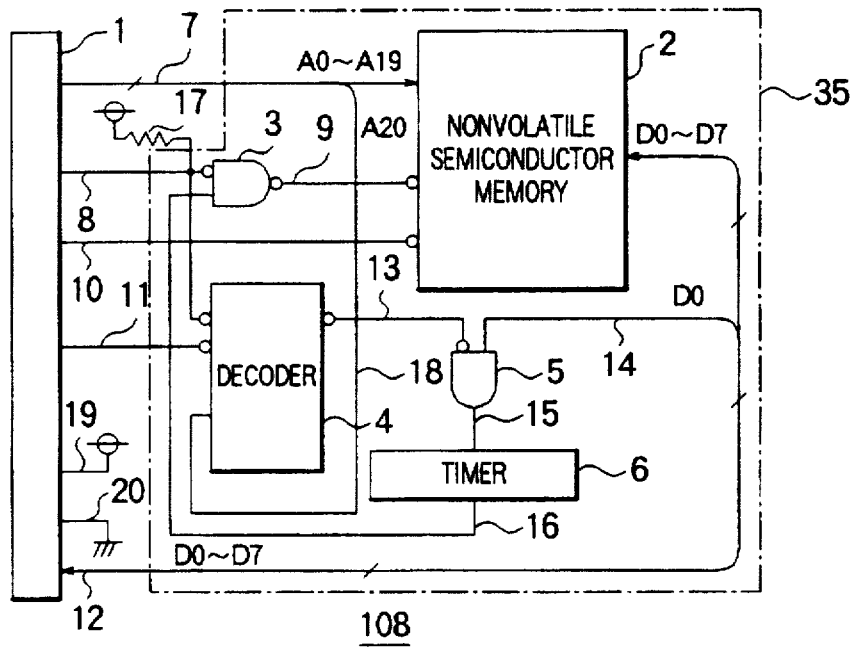
FIG. 18 is a block diagram illustrating the configuration of a nonvolatile memory card according to an eighth embodiment of the present invention.
Figure 19:
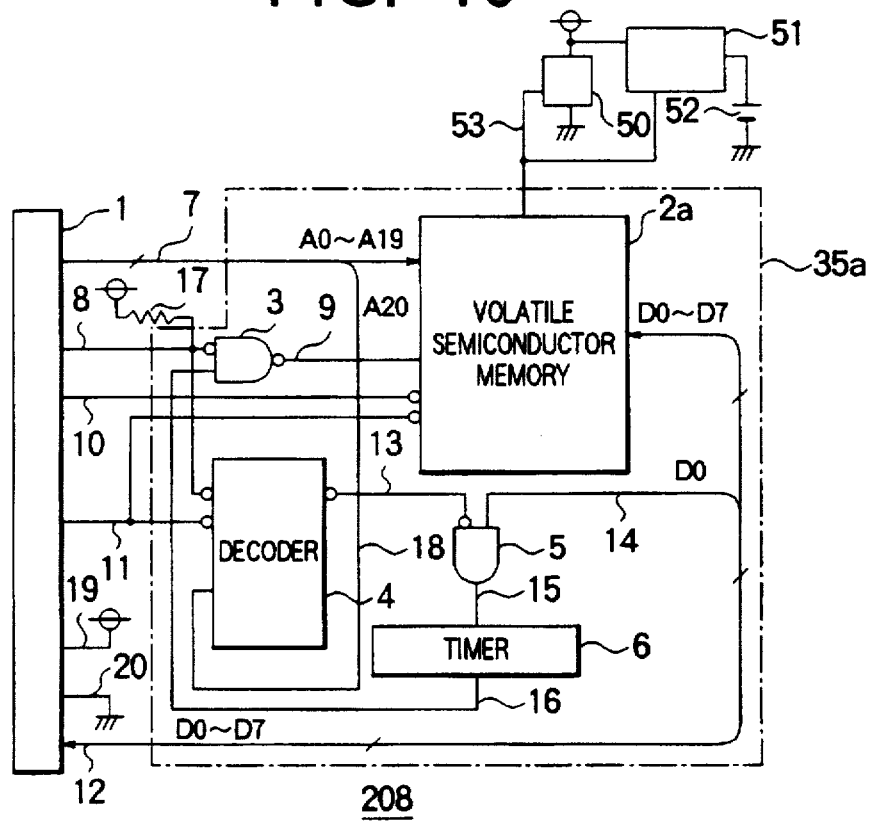
FIG. 19 is a block diagram illustrating the configuration of a volatile memory card according to the eighth embodiment of the present invention.

FIG. 18 is a block diagram illustrating the configuration of a nonvolatile memory card according to an eighth embodiment of the present invention, and FIG. 19 is a block diagram illustrating the configuration of a volatile memory card also according to the eighth embodiment of the present invention. In this embodiment, the electronic circuit of the memory card including the timer 6, the decoder 4, the memory 2 or 2a, and other elements is constructed on a single semiconductor chip. In the nonvolatile memory card 108 shown in FIG. 18, the entire circuit is formed on a single semiconductor chip 35 in the form of one chip card. In the case of the volatile memory card 208 shown in FIG. 19, all parts of the circuit except for the data backup circuit composed of elements 50–53 are formed on a single semiconductor chip 35a in the form of one chip card. One of the advantages resulting from the one-chip construction is that it becomes more difficult to discover the data protection scheme from the outside, and thus the memory card can have a more powerful data protection capability.

Embodiment 9

Figure 20:
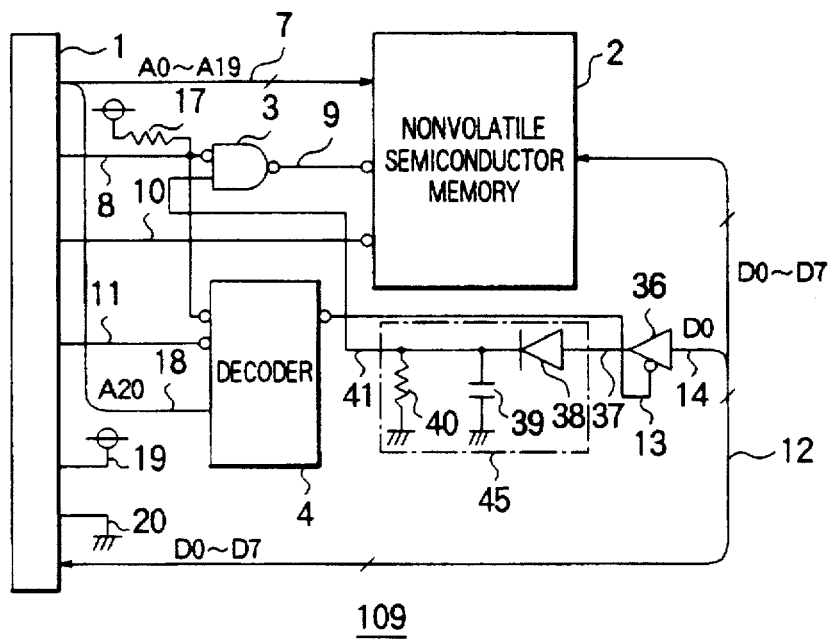
FIG. 20 is a block diagram illustrating the configuration of a nonvolatile memory card according to a ninth embodiment of the present invention.
Figure 21:
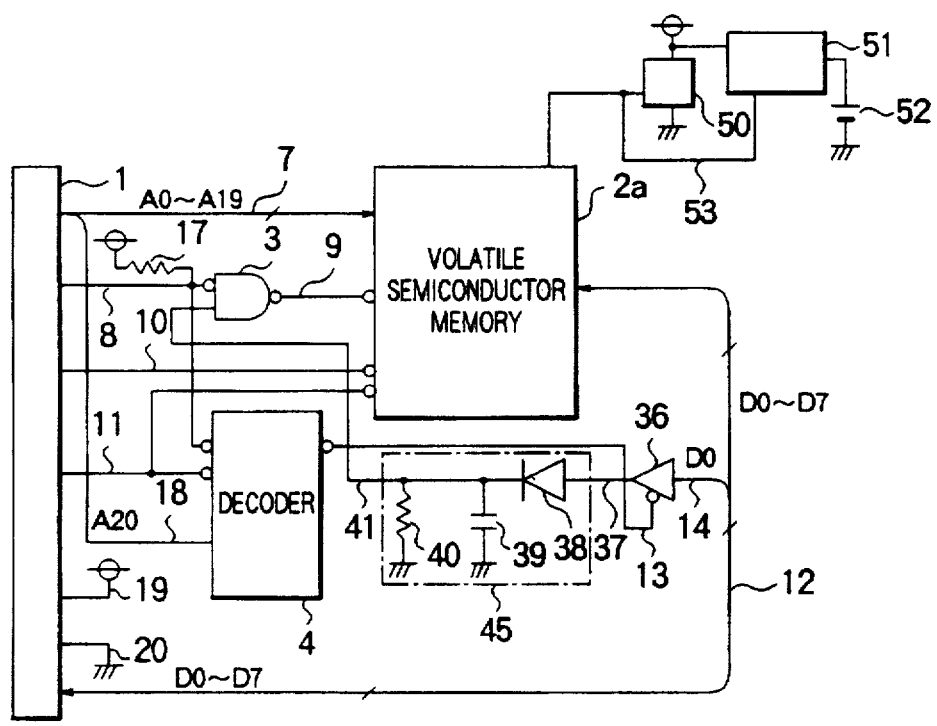
FIG. 21 is a block diagram illustrating the configuration of a volatile memory card according to the ninth embodiment of the present invention.

FIG. 20 is a block diagram illustrating the configuration of a nonvolatile memory card according to a ninth embodiment of the present invention, and FIG. 21 is a block diagram illustrating the configuration of a volatile memory card also according to the ninth embodiment of the present invention. In this embodiment, the timer is constructed using an analog circuit. The nonvolatile memory card 109 shown in FIG. 20 and also the memory card 209 shown in FIG. 21 have a timer 45 constructed using an analog circuit. The timer 45 comprises: a diode 38 for preventing a reverse current flow; a capacitor 39, and a resistor 40. This timer 45 works according to the discharging time of the capacitor 39. Reference numeral 36 denotes a three-state buffer that is controlled by the output signal 13 of the decoder 4. When the output signal 13 of the decoder 4 is at an L-level and the least significant bit (DO) of the data bus 12 is at an H-level, the capacitor 39 is charged. During a time period in which the charge stored in the capacitor 39 is discharged via the resistor 40, the output 41 is maintained at an H-level, thereby achieving timer operation.

The present invention has various advantages as described below. In the memory card according to the first aspect of the invention, there is provided data protection means that works as follows: When the timer is in an inactive state, the control signal for the memory means is inhibited from getting access to the memory means regardless of the state of the external signal. If dummy writing of the particular data into the timer is performed, the timer becomes active. As a result of the activation of the timer, the external control signal becomes valid and thus it is permitted to get access to the memory during a preset time period. With this data protection means, any access to the memory is inhibited unless the dummy writing of the predetermined data into the timer is performed. Furthermore, if it is desired to have continuous access to the memory, it is required to repeatedly perform the above-described dummy writing during normal operation at time intervals shorter than the timeout value of the timer. This provides more powerful and more reliable data protection capability to the memory card.

In the memory card according to the second aspect of the present invention, the data protection means comprises: a timer for generating an output indicating whether the timer is in an active state; a decoder for detecting whether the control signal and the address are in a state in which the dummy writing of data into the timer is performed; a gate circuit that receives the output of the decoder and one bit of the dummy data, wherein when the output of the decoder and the one bit of the dummy data have predetermined values, respectively, the gate circuit outputs a signal for starting the timer; and a gate circuit disposed either in the path of the control signal or in the path of the address, wherein, in response to the output of the timer, the gate circuit makes the control signal invalid during a period in which the timer is in an inactive state wherein the data that is written in the dummy writing process consists of one-bit data having either an H-level or an L-level. This relatively simple configuration can achieve powerful data protection and thus can provide a reliable memory card.

In the memory card according to the third aspect of the present invention, there is further provided protection concealing means that activates the timer of the data protection means just after electrical power has been turned on thereby concealing the data protection capability so that the memory card looks as if it does not have the data protection capability. This will confuse an unauthorized person, and therefore provide more powerful data protection capability to the memory card.

In the memory card according to the fourth aspect of the present invention, the data protection means comprises: a timer for generating an output indicating whether the timer is in an active state; a decoder for detecting whether the control signal and the address are in a state in which the dummy writing of data into the timer is performed; a data examination decoder for determining whether the data that has been dummy-written is identical to predetermined data; a gate circuit that receives the output of the decoder and the output of the data examination decoder wherein when the output of the decoder and the output of the data examination decoder have predetermined values, respectively, the gate circuit outputs a signal for starting the timer; and a gate circuit disposed either in the path of the control signal or in the path of the address, wherein, in response to the output of the timer, the gate circuit makes the control signal and the address signal invalid during a period in which the timer is in an inactive state wherein the data that is written in the dummy writing process consists of a plurality of bits. This provides more powerful and more reliable data protection capability to the memory card.

In the memory card according to the fifth aspect of the present invention, there is further provided timer timeout value changing means for externally changing a timeout value of the timer of the data protection means. This allows a user to select an active time period of the timer. Thus, the fifth aspect of the present invention provides a high-reliability memory card that can be used in various applications that require various timeout values of the timer.

In the memory card according to the sixth aspect of the present invention, the entire circuit is constructed on a single chip. This makes discovering the data protection scheme from the outside more difficult. Thus, the sixth aspect of the invention provides a high-reliability memory card having a more powerful data protection capability.

What is claimed is:

1. A memory card comprising:

a memory;

input/output means including:
- a data bus for inputting data to and outputting data from the memory,
- an address bus for inputting memory addresses to the memory, and
- control connections for inputting control signals for controlling the memory, each control signal having a respective active state and an inactive state, the control signals including a card enable signal, a write control signal, and a read control signal;

data protection means including:
- a decoder connected to the address bus and to the control connections of the input/output means for generating a trigger signal in response to detection of a specific address on the address bus when both of the card enable signal and the write control signal are in their active states;
- a first logic circuit connected to the decoder and the data bus for generating a timer enable/reset signal each time a specific data signal appears on the data bus while the trigger signal is being received by the first logic circuit from the decoder;
- a timer connected to the first logic circuit and placed in an active state of generating a timer signal for an active time period in response to the generation of the trigger signal and returning to an inactive state, not generating the timer signal, when the active time period elapses and including:
  - a counter circuit for counting from an initial value to a timeout value;
  - means for enabling the counter circuit to begin counting in response to a timer enable/reset signal received from the first logic circuit;
  - means for resetting the counter circuit to the initial value, to prevent reaching the timeout value, in response to each timer enable/reset signal received from the first logic circuit; and
  - means for generating an active output signal during counting and an inactive output signal when counting reaches the timeout value;
- a first gate connected to the timer and receiving the card enable signal, for generating a memory access signal in response to the active output signal received from the timer when the card enable signal is in the active state, permitting reading of stored data from the memory when the read control signal is in the active state and storing of data in the memory when the write control signal is in the active state wherein, in order to write data to and read data from the memory, the specific data signal is sent repeatedly to the first logic circuit to prevent the counter circuit from reaching the timeout value; and protection concealing means connected to the timer for producing a timer enable/reset signal in response to each initial application of electrical power to the memory card, the timer initiating counting in response to a time enables/reset signal produced by the protection concealing means, and producing an active output during counting, thereby permitting reading of stored data from the memory and storing of data in the memory during an active time period immediately following each initial application of electrical power to the memory card.

2. The memory card according to claim 1 wherein the memory, the input/output means, and the data protection means are constructed on a single chip.

3. The memory card of claim 1 wherein the protection concealing means comprises:

a capacitor and a resistor serially connected between ground and a power supply for generating an enable signal in response to each initial application of electrical power to the memory card; and a second gate connected to the capacitor, the first logic circuit, and the timer for generating a timer enable/reset signal in response to generation of the enable signal, the timer initiating counting in response to generation of a timer enable/reset signal by the second gate and producing an active output signal during counting, thereby permitting read and write access to the memory for a limited time period after each initial application of electrical power to the memory card.

4. The memory card of claim 1 comprising a data examination decoder connected to the data bus and the first logic circuit and storing data bits, for receiving data bits from the data bus and for generating a valid data signal when the data bits received from the data bus are identical to data bits stored in the data examination decoder, wherein the first logic circuit generates a timer enable/reset signal in response to concurrently receiving the valid data signal and the trigger signal.

5. The memory card of claim 1 wherein the first logic circuit is connected to at least one bit of the data bus.

6. The memory card according to claim 1 wherein the first logic circuit comprises an AND gate producing a timer enable/reset signal only upon simultaneous receipt of the trigger signal from the decoder and the specific data signal from the data bus.

* * * * *